SOUND RECORDING AND REPRODUCING APPARATUS DRIVING MECHANISM

Filed April 25, 1960 3 Sheets-Sheet 1

INVENTORS.
GÜNTER HERRMANN
REINHARD GOERLICH
BY Imirie and Smiley
ATTORNEYS.

April 16, 1963 G. HERRMANN ETAL 3,085,758

SOUND RECORDING AND REPRODUCING APPARATUS DRIVING MECHANISM

Filed April 25, 1960 3 Sheets-Sheet 2

INVENTORS.
GÜNTER HERRMANN
REINHARD GOERLICH
BY
Imirie and Smiley
ATTORNEYS.

SOUND RECORDING AND REPRODUCING APPARATUS DRIVING MECHANISM

INVENTORS.
GÜNTER HERRMANN
REINHARD GOERLICH
BY
Imrie and Smiley
ATTORNEYS.

United States Patent Office 3,085,758

Patented Apr. 16, 1963

3,085,758

SOUND RECORDING AND REPRODUCING APPARATUS DRIVING MECHANISM

Günter Herrmann and Reinhard Goerlich, Hannover, Germany, assignors to Protona Produktionsgesellschaft fuer elektro-akustiche Geraete m.b.H., Hamburg, Germany Filed Apr. 25, 1960, Ser. No. 24,488
Claims priority, application Germany Apr. 25, 1959
4 Claims. (Cl. 242—55.12)

The present invention concerns a driving gear for wire-form or tape-form sound carriers, particularly for pocket-size magnetic sound recorders, comprising a sound recording roll which is resiliently connected to a motor via a balancing mass and is located on a clutch disc, wherein the drive of the spool spindles is obtained only by the traction of the sound carrier. Variations in speed of the driving mechanism, which are determined only by the travelling speed of the sound carrier, are kept remote from the sound recording roll by the balancing masses interposed between the motor and the sound recording roll.

In the case of such apparatus, the object to be achieved, depending on the changing diameters of the spool reels, is to allow one spool spindle to rotate at a different speed from the other spool spindle. Otherwise the sound carrier is not stretched tightly enough between the spools. Complicated compensating gear mechanisms between the spool spindles are also known. However, such compensating gears require a great deal of space and are usually noisy in operation. Pocket-size recorders, however, do not have the necessary space and they must not be noisy.

Moreover, in the case of such driving gears which have considerable recording capacity, it is desirable, in order to locate definite points on the sound carrier, to allow said sound carrier to travel forward or backward much more quickly than is normally necessary for reproducing or recording. For this purpose friction or toothed wheel gearing is known which, however, also occupies space with its mechanical reversing switches and usually operates with a certain amount of noise.

The present invention therefore provides a driving mechanism having high synchronising accuracy and, together therewith is also adapted to receive its supply as direct current from batteries, occupies a minimum of space and the noise level of which is no longer audible, by the feature that the spindle of the take-up spool is driven by the spindle of the spool which is under traction, via a combined slipping clutch transmission gear. If a reversing motor is used, this driving mechanism can be used by changing the poles of the motor both for forward running and rewind with one or more gear speeds. The driving mechanism has the advantage of not requiring any other clutch between the sound recording roll or the motor and the spool spindles or hubs in order to occupy very little space and to reduce the level of noise to the minimum. The driving mechanism has a very light weight and operates with maximum synchronism of the sound carrier, even when the speed of the driving motor fluctuates. The slipping clutch between the two spool spindles is simultaneously dependent on the direction of rotation of this driving mechanism. Therefore the movement of one spool spindle always drives the other spool spindle of the sound carrier which is under traction with the result that said sound carrier always remains tightly stretched between the sound recording roll and the spools.

If it is desired to use only a simple driving motor always rotating in the same direction, an intermediate gear is required for forward running and rewind running of the driving gear and for different speeds, and is located between the recording roll or the clutch disc on which the sound recording roll is located, and the spool spindles. In the present invention, this gear comprises an adjustable intermediate gear wheel (idler) between the clutch disc and the spool spindles or hubs, which intermediate gear wheel is selectively moved into its inoperative position for forward running with normal speed or is coupled via the clutch disc with the first spool spindle or the driving hub thereof or with the interposition of another over-hung intermediate gear wheel with the second spool spindle or its driving hub. Thus only two intermediate gear wheels are required which, during forward running, i.e. both during recording and reproduction, are stopped and therefore neither cause any noise nor load the drive by their friction forces. Thus the synchronised running of the sound carrier is ensured also in the case of this construction.

The shifting of the adjustable intermediate gear wheel into the various operating positions is initiated by a switch lever actuated by a trip bar and fixed by a guide plate. Thus the control of the intermediate wheel is rendered possible by pressure elements acting on the trip bar, for example, by a conventional set of push buttons. The trip bar simultaneously controls the pressure roller relative to the sound recording roll, a feature which the driving gear further simplifies.

The invention will be described further, by way of example, with reference to the accompanying drawings, in which.

Figure 4:
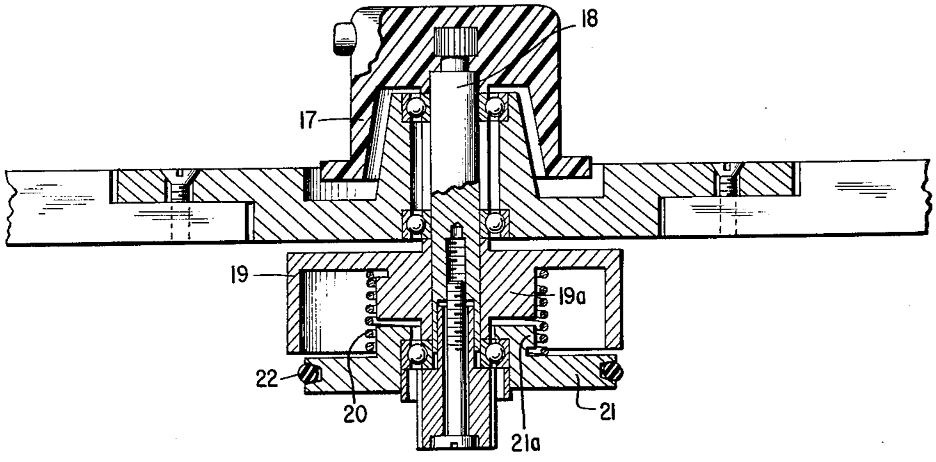
FIG. 4 is an axial section through the first spool plate taken on the line 4—4 of FIG. 1.

*Driving mechanism in forward drive to obtain a recording or reproduction with normal speed.*—The non-catching forward-rewind push button is momentarily depressed and thereafter released, the push button bears against the tip 1*a* of a trip bar 1, which is movable round a pinion 1*b* against the force of a spring 1*c*, during which a catch 2, pivoted at 2*a* and 2*b*, turns upwards out of its stop position and lays a pressure roller 7, via lever arms 3, 4, 5 against the recording roller 8 by the pressure of a spring 6. (The pressure spring 6 also moves the catch 2 back into the flapped down original position, if the trip bar 1 returns to its rest position.) Then the reversing motor 9 is switched over to forward driving and drives the balancing roller 12, which is frictionally coupled by a spring with the friction cone 11 via a drive belt 10. The coating 13 of the friction cone 11 imparts this driving to the friction disc 14 of the recording roller, which acts as an additional balancing mass, and the recording roller 8, rigidly mounted thereon. In so doing, the motion is also imparted to the sound carrier 15 between the recording roller 8 and the pressure roller 7 as well as to the supply spool 16. As is evident from FIG. 4 the supply spool 16 is mounted on a spool capstan 17, which is rigidly coupled with the friction disc 19 on spool spindle 18. The hub **19*a* of the spool friction disc 19 is coupled with the hub 21*a* of a free motion pulley 21 on spindle 18 by means of a torsion spring 20 in such a way that it shortens during the rotation of the spool friction disc 19 in a clockwise direction, whereby the rotation is imparted to the pulley 21. The pulley 21 is coupled via an elastic transmission belt 22 with the friction disc 23, which is rotatably mounted on to the axial slidable bushing 25 of spindle 24. A frictional coating 23*a* imparts the rotation to the friction disc 27, pressed down by cup or plate spring 26 and to the spool friction disc 28, rigidly mounted on spindle 24, so that spindle 24 rotates the receiving spool (not shown) on hub 29**.

The transmission ratio between the pulley 21 and the friction disc 23 is designed in such a manner that the latter is in each case rotating much faster than necessary to reel the sound carrier 15 onto the receiving spool on hub 29. The slipping between friction discs 23 and 27 acts as an equalizer for the different angular speed of hubs 17 and 29.

In operating the recording push button, catch 2 is pressed upwards by which the before described position of the driving mechanism is obtained. At the same time the recording button switches the motor 9, which is regulated by the governor **9*a***, into its forward driving condition and the amplifier (not shown) into its recording condition.

In order to put the driving mechanism in the position for fast forward drive the playback button has to be continually pressed down. In so doing, first the pressure roller 7 is disengaged from the recording roller 8 via catch 2, as already described. Besides the trip bar 1 moves in a clockwise direction and imparts this motion to the switch lever 30, the end of which, provided with a pin **30*a* slides into a guide plate 31 and is suspended on pin 33 by means of a spring 32. Guide plate 31 allows only two fixed switching positions to the switch lever 30. If the trip bar 1 has been moved towards the right, the intermediate wheel 34, rotatingly mounted on the switch lever 30 comes into friction towards the right with friction disc 14 and spool friction disc 28, so that spindle 24** is rotating in clockwise direction with much increased speed.

Figure 3:
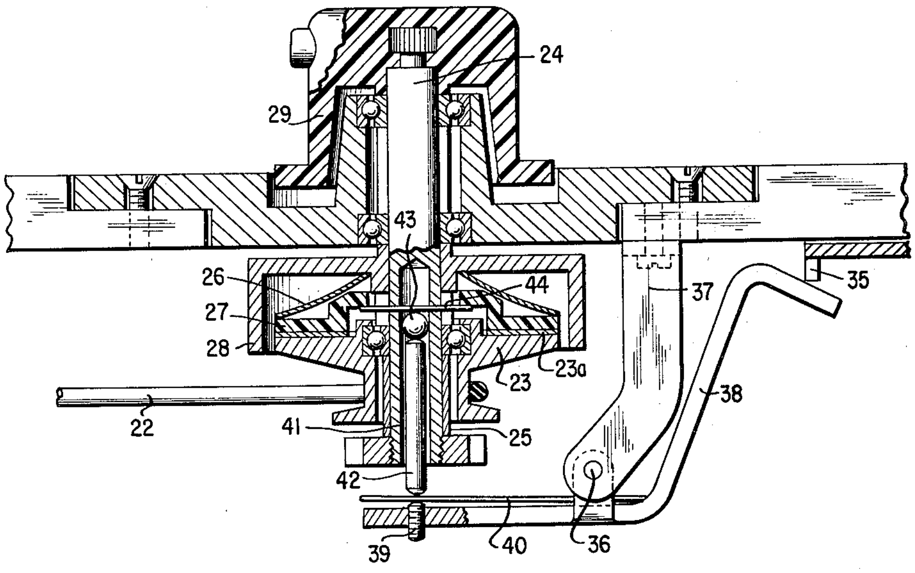
FIG. 3 is an axial section through the second spool hub taken on the line 3—3 of FIG. 1.

To release the friction between friction discs 23 and 27 during fast forward driving, the listen key (FIG. 3) is pressed down, whereby the lever 38, which is linked with the bearing bracket 37 at 36, moves from the tip 35 of the lower blade of trip bar 1 towards the right and presses by means of a leaf spring 40, adjustable by a grub screw 39, the switch pin 42, threaded through a hole 41 of spindle 24, against a ball 43, which lifts the driving pin 44 and in so doing removes the friction disc 27 from the friction disc 23 against the force of cup spring 26. Now, the spool capstan 17, shown in FIG. 4 can freely follow by the pull of the sound carrier, because at the same time the torsion spring 20 is wound up and so the friction with the pulley 21 is increased. In retaining a certain friction between discs 23 and 27 and the torsion spring 20, a certain braking force can be exerted on the following spool capstan 17, in order to avoid an over-loading of the spool after stopping the driving mechanism. As soon as the listen key is released, the intermediate wheel 34 moves back into its rest position. The sound carrier runs in forward drive direction with normal speed, regulated by governor **9*a*** of the motor.

To put the driving mechanism into the position for fast rewind driving, the rewind button is pressed and trip bar 1 moves into anti-clockwise direction and releases at the same time, as already described, the pressure roller 7 from the recording roller 8 by the tip **1*d* of the trip bar 1. Trip bar 1 also pushes the switch lever 30 towards the left, whereby the guide plate 31 also tilts towards the left and the intermediate wheel 34 slides into friction between friction disc 14 and the idle wheel 46, pivoted at pin 45, said idler becoming adjacent to the spool friction disc 19 by the pressure of the intermediate wheel 34. Then spindle 18 and the spool friction disc 19 run with much increased speed in anti-clockwise direction, whereby the torsion spring 20 is slightly unwound and thus the friction with pulley 21 slackened or abolished respectively. To obtain the necessary braking force for respooling the spindle 18, now the remaining friction between hub 19*a* and 21*a* with the torsion spring 20, the inversed transmission ratio between friction disc 23 and pulley 21 and the frictional coupling between friction disc 23 and 27** takes care.

In pressing the playback button or the recording button, the rewind button is released. Trip bar 1 returns to its rest position by the pressure of spring **1*e* just as does the intermediate wheel 34**.

In order to obtain the stop position of the driving gear, the stop button is pressed and in doing so only catch 2 is moved upwards, the pressure roller 7 is released from the recording roller 8 in the manner already described, and at the same time the reversing motor 9 is switched off.

Figure 1:
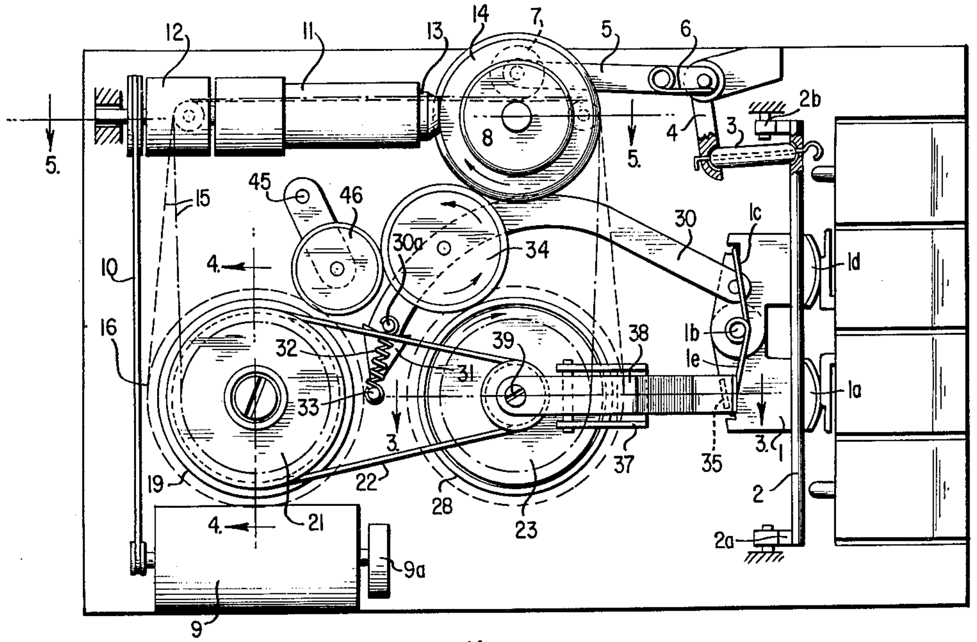
FIG. 1 shows the driving mechanism, seen from below, in forward driving position to obtain a recording or reproduction at normal speed.
Figure 2:
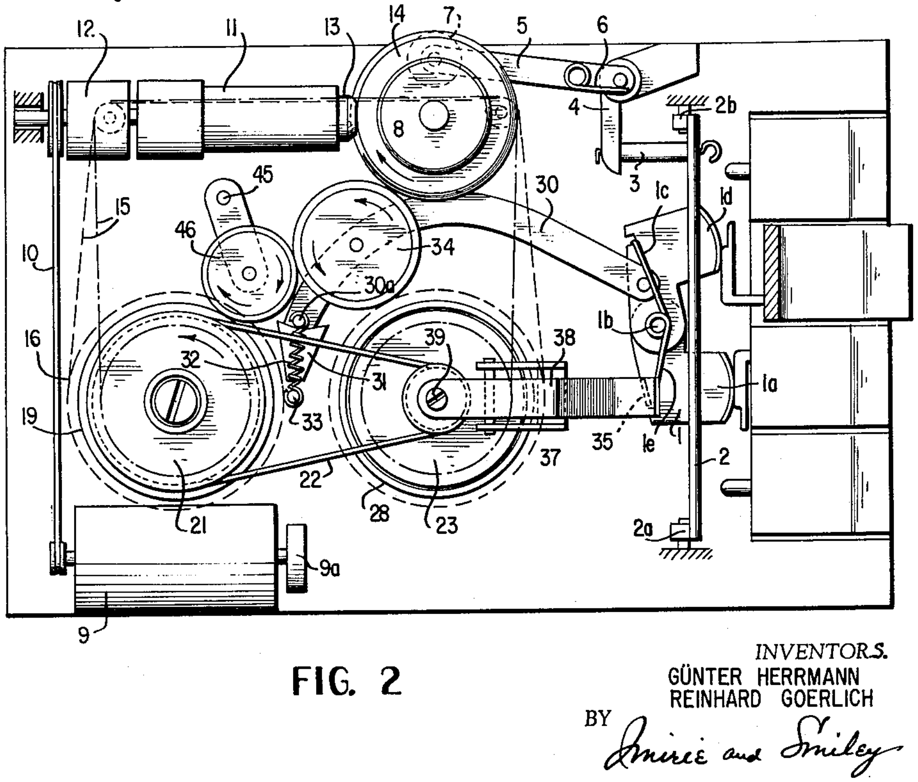
FIG. 2 shows the position of the driving mechanism, seen from below, to obtain a fast rewind drive.
Figure 5:
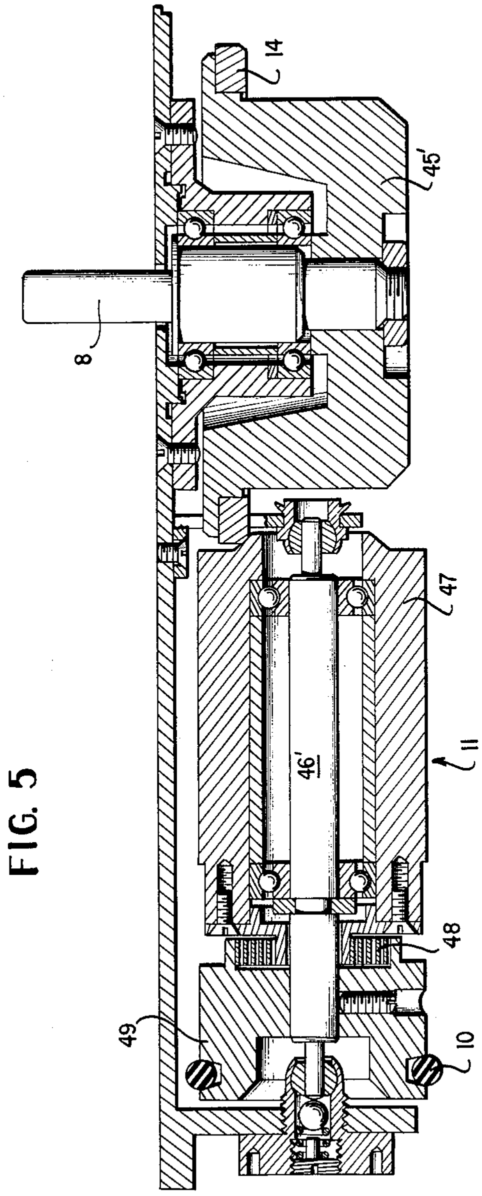
FIG. 5 is a vertical section taken on the line 5—5 of FIG. 1.

The synchronism can be further improved by suitable construction of the balancing masses interposed between the motor and sound recording roll. A special construction for this purpose is shown in FIG. 5. The clutch disc 14 of FIGS. 1 and 2 supporting the sound roll 8 is constructed here as a pot-shaped balancing mass 45' and driven by the compensating balancing mass 11 which rotates at much higher speed. The compensating mass 11 consists of a cylindrical roller 47 freely rotatable on the spindle 46' and is resiliently connected by way of a spiral spring 48 to a belt pulley 49 keyed to the spindle 46'. The belt pulley 49 is driven by the motor 9 via a drive belt 10.

In this construction the brief speed fluctuations of the motor 9 are first partly received by the drive belt 10 and then substantially by the cylindrical roller 47 adjustable through a wide angle relative to the belt pulley 49. Thus all insufficiently damped speed fluctuations of the belt 10 are reliably kept remote from the balancing mass 45' of the recording roll 7 which can then draw the sound carrier through practically at an absolutely uniform speed.

We claim:

1. A drive mechanism for a pocket sized magnetic sound recorder comprising a driving motor, a recording roller for rolling engagement with a record carrier and secured to a balancing disc, a balancing mass driven by said motor and in frictional engagement with said balancing disc to drive the recording roller, a pair of spindles for carrying take-up and supply spools for the record carrier, a plurality of push buttons, a trip bar having a pivot and portions engageable by said push buttons to turn the trip bar, an arcuately shaped switch lever pivoted at one end to said trip bar at a point spaced from its pivot, the free end of said switch lever being resiliently fastened to permit restrained movement to a plurality of operating positions, a friction disc rotatably mounted on an intermediate portion of said switch lever and movable with the free end of the lever to drivingly couple said balancing disc to one or the other of said spindles in certain of the operating positions of the switch lever, a pin on the free end of said switch lever and a rigidly mounted guide plate for receiving said pin and holding the free end of the switch lever in each of said operating positions whereby the movement of the switch lever and friction disc into the various operating positions initiated by said push buttons is accomplished by guided reception of the switch lever pin in said guide plate.

2. A drive mechanism according to claim 1, wherein a pressure roller movably cooperates with the recording roller, said pressure roller being mounted on a lever mechanism coupled to said trip bar and moved by operation of said push buttons.

3. A drive mechanism according to claim 1 wherein said balancing mass comprises a balancing roller arranged between said recording roller and the driving motor, said balancing roller including several individual balancing masses coupled by a spiral spring providing a resilient coupling between the individual balancing masses of the balancing roller.

4. A drive mechanism according to claim 3 in which said balancing roller is driven by the driving motor via an elastic belt.

References Cited in the file of this patent

UNITED STATES PATENTS

| | | |
|---|---|---|
| 2,712,448 | Schroter | July 5, 1955 |
| 2,793,039 | Hironimus | May 21, 1957 |
| 2,838,250 | Stavrakis et al. | June 10, 1958 |
| 2,898,055 | Genning et al. | Aug. 4, 1959 |
| 2,920,148 | Munroe | Jan. 5, 1960 |